United States Patent
Majnemer et al.

(10) Patent No.: US 12,461,789 B2
(45) Date of Patent: Nov. 4, 2025

(54) REDISTRIBUTING TENSOR ELEMENTS BETWEEN MACHINE LEARNING COMPUTING UNITS

(71) Applicant: Google LLC, Mountain View, CA (US)

(72) Inventors: David Alexander Majnemer, Sunnyvale, CA (US); Ravi Narayanaswami, San Jose, CA (US); Dong Hyuk Woo, San Jose, CA (US); Carrell Daniel Killebrew, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 924 days.

(21) Appl. No.: 17/629,437

(22) PCT Filed: Oct. 7, 2020

(86) PCT No.: PCT/US2020/054554
§ 371 (c)(1),
(2) Date: Jan. 24, 2022

(87) PCT Pub. No.: WO2021/071930
PCT Pub. Date: Apr. 15, 2021

(65) Prior Publication Data
US 2022/0245453 A1 Aug. 4, 2022

Related U.S. Application Data

(60) Provisional application No. 62/911,678, filed on Oct. 7, 2019.

(51) Int. Cl.
*G06F 9/50* (2006.01)
*G06F 7/76* (2006.01)
*G06N 3/08* (2023.01)

(52) U.S. Cl.
CPC .............. *G06F 9/5066* (2013.01); *G06F 7/76* (2013.01); *G06F 9/5016* (2013.01); *G06N 3/08* (2013.01)

(58) Field of Classification Search
CPC .............................. G06F 9/4881; G06F 9/505
See application file for complete search history.

(56) References Cited

U.S. PATENT DOCUMENTS 9,710,265 B1   7/2017   Temam et al.
9,836,691 B1   12/2017  Narayanaswami et al.
(Continued)

FOREIGN PATENT DOCUMENTS

CN       1152365 A       6/1997
CN       109324827 A     2/2019

OTHER PUBLICATIONS

International Preliminary Report on Patentability in International Appln. No. PCT/US2020/054554, dated Apr. 21, 2022, 7 pages.
(Continued)

*Primary Examiner* — Eric C Wai
(74) *Attorney, Agent, or Firm* — Fish & Richardson P.C.

(57) ABSTRACT

Methods, systems, and apparatus, including an apparatus for redistributing tensor elements among computing units are described. In one aspect, a method includes distributing tensor elements of an N-dimensional tensor among multiple computing units of a computation system. Each computing unit redistributes the subset of tensor elements previously distributed to the computing unit to computing units. Each computing unit accesses redistribution partitioning data that specifies, for each computing unit, the tensor elements that are to be stored by the computing unit after redistributing the tensor elements. For each tensor element previously distributed to the particular computing unit, the computing unit determines a global linearized index value for the tensor element based on a multi-dimensional index for the tensor (Continued)

element. The computing unit determines, using the redistribution partitioning data and the global linearized index value, a destination computing unit and sends the tensor element to the destination computing unit.

20 Claims, 6 Drawing Sheets

(56) References Cited

U.S. PATENT DOCUMENTS

| | | | |
|---|---|---|---|
| 9,875,104 B2 | 1/2018 | Woo et al. | |
| 10,175,980 B2 | 1/2019 | Temam et al. | |
| 10,248,908 B2* | 4/2019 | Temam | G06N 3/08 |
| 11,086,968 B1* | 8/2021 | Baskaran | G06F 16/1744 |
| 2018/0365561 A1 | 12/2018 | Temam et al. | |

OTHER PUBLICATIONS

International Search Report and Written Opinion in International Appln. No. PCT/US2020/054554, dated Feb. 3, 2021, 12 pages.
nvdla.org [online], "NVDLA Primer," Sep. 17, 2018, retrieved on Jun. 27, 2022, retrieved from URL<http://nvdla.org/primer.html>, 14 pages.
Office Action in Chinese Appln. No. 202080058657.7, mailed on Jul. 1, 2025, 9 pages (with English translation).
Schatz, "Distributed Tensor Computations: Formalizing Distributions, Redistributions, and Algorithm Derivation," Dissertation for the degree of Doctor of Philosophy, University of Texas at Austin, Dec. 2015, 192 pages.

* cited by examiner

REDISTRIBUTING TENSOR ELEMENTS BETWEEN MACHINE LEARNING COMPUTING UNITS

CROSS-REFERENCE TO RELATED APPLICATIONS

This application is a National Stage Application under 35 U.S.C. § 371 and claims the benefit of International Application No. PCT/US2020/054554, filed Oct. 7, 2020, which claims priority to U.S. Application No. 62/911,678, filed Oct. 7, 2019, entitled REDISTRIBUTING TENSOR ELEMENTS BETWEEN MACHINE LEARNING COMPUTING UNITS. The foregoing applications are incorporated herein by reference in their entirety.

BACKGROUND

Neural networks are machine learning models that employ one or more layers of models to generate an output, e.g., a classification, for a received input. The input to a neural network can include a multidimensional tensor that includes tensor elements. Some neural networks include one or more hidden layers in addition to an outer layer. The output of each hidden layer is used as input to the next layer in the network, i.e., the next hidden layer or the output layer of the network. Each of the layers generates an output from a received input in accordance with current values of a respective set of parameters.

SUMMARY

This specification generally relates to hardware neural network computing units and networks between the computing units configured to redistribute tensor elements between the computing units.

In general, one innovative aspect of the subject matter described in this specification can be embodied in methods that include distributing tensor elements of an N-dimensional tensor among multiple computing units of a computation system, wherein each computing unit performs computations using a subset of the tensor elements distributed to the computing unit; receiving an instruction to redistribute the tensor elements of the N-dimensional tensor among the computing units; in response to receiving the instruction, redistributing, by each computing unit, the subset of tensor elements previously distributed to the computing unit to one or more computing units of the computation system, including, for each particular computing unit of the computation system: accessing redistribution partitioning data that specifies, for each computing unit, the tensor elements that are to be stored by the computing unit after redistributing the tensor elements; for each tensor element previously distributed to the particular computing unit: determining a global linearized index value for the tensor element based on a multi-dimensional index for the tensor element in the N-dimensional tensor, the multi-dimensional index for the tensor element including, for each dimension of the N-dimensional tensor, an index value that corresponds to a position of the tensor element along that dimension of the N-dimensional tensor; determining, using the redistribution partitioning data and the global linearized index value for the tensor element, a destination computing unit of the computation system to which the tensor element is to be redistributed; and sending the tensor element to the destination computing unit.

These and other implementations can each optionally include one or more of the following features. In some aspects, the tensor elements of the N-dimensional tensor are redistributed in response to reshaping the N-dimensional tensor, the reshaping including adjusting a number of tensor elements in two or more dimensions of the N-dimensional tensor. Determining, using the partitioning data and the global linearized index value for the tensor element, a destination computing unit of the computation system to which the tensor element is to be redistributed can include determining, based on the global linearized index value for the tensor element and a number of tensor elements in each dimension of the reshaped N-dimensional tensor, a second multi-dimensional index for the tensor element in the reshaped N-dimensional tensor; and determining, based on the multi-dimensional index for the tensor element and the redistribution partitioning data, the destination computing unit to which the tensor element is to be redistributed.

In some aspects, distributing the tensor elements of the N-dimensional tensor among the computing units of the computation system includes partitioning the N-dimensional tensor into multiple tensor slices based on one or more tiled dimensions of the N-dimensional tensor; and distributing one or more tensor slices of the N-dimensional tensor to each computing unit. The tensor elements of the N-dimensional tensor are redistributed in response to a change in the one or more tiled dimensions based on which the N-dimensional tensor is partitioned.

In some aspects, sending the tensor element to the destination computing unit can include generating, for the tensor element, header information that specifies the destination computing unit; transferring the header information and the tensor element to a lane of a tile-to-tile network managed by the particular computing unit; and storing, by the destination computing unit, the tensor element in a queue for the particular computing unit, wherein each computing unit includes a respective queue for each computing unit of the computation system, each respective queue stores tensor elements received from the corresponding computing unit that corresponds to the respective queue.

Some aspects can include, for each computing unit of the computation system, traversing, based on the redistribution partitioning data, a second subset of tensor elements that are being redistributed to the computing unit, including for each particular tensor element in the second subset: determining the global linearized index value for the particular tensor element; determining, based on the global linearized index value for the particular tensor element and distribution partitioning data, an origination computing unit from which the particular tensor element was received, the distribution partitioning data specifying, for each computing unit, the tensor elements that are to be stored by the computing unit after the tensor elements are distributed; obtaining the particular tensor element from the respective queue for the origination computing unit; and storing the particular tensor element in local memory of the computing unit.

In some aspects, determining the global linearized index value for the particular tensor element includes determining the global linearized index value based on the multi-dimensional index for the particular tensor element.

The subject matter described in this specification can be implemented in particular embodiments so as to realize one or more of the following advantages. Using a global linearized index value for each tensor element allows computing units of a computation system to efficiently redistribute tensor elements among computing units in response to the tensor being reshaped or the tiled dimension(s) along which the tensor is partitioned between the computing units are changed. For example, each computing unit can determine which computing unit owns (e.g., is storing and/or performing computations using) a tensor element based on the global linearized index value for the tensor element. By having a computing unit that receives a tensor element compute the global linearized index value for the received tensor element, less data is transferred between computing units as the global linearized index value does not have to be transferred with the tensor element. This enables the computation system to use a narrower tile-to-tile network and increases addressing flexibility for the tensor elements. For example, if a tensor includes thousands of tensor elements, a unique identifier for each tensor element may require more data in a header than the actual payload of the tensor element, which would require a wider tile-to-tile network and more data to be transferred between computing units than using the techniques described in this document. Transferring less data also results in faster data transmissions, which results in faster machine learning computations.

Other implementations of this and other aspects include corresponding systems, methods, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions. Another implementation includes computer storage medium encoded with a computer program, the program comprising instructions that when executed by one or more data processing apparatus cause the data processing apparatus to perform operations comprising a method according to any aspect or implementation described herein. The computer storage medium may be a non-transitory computer storage medium, but this implementation is not limited to a non-transitory computer storage medium.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
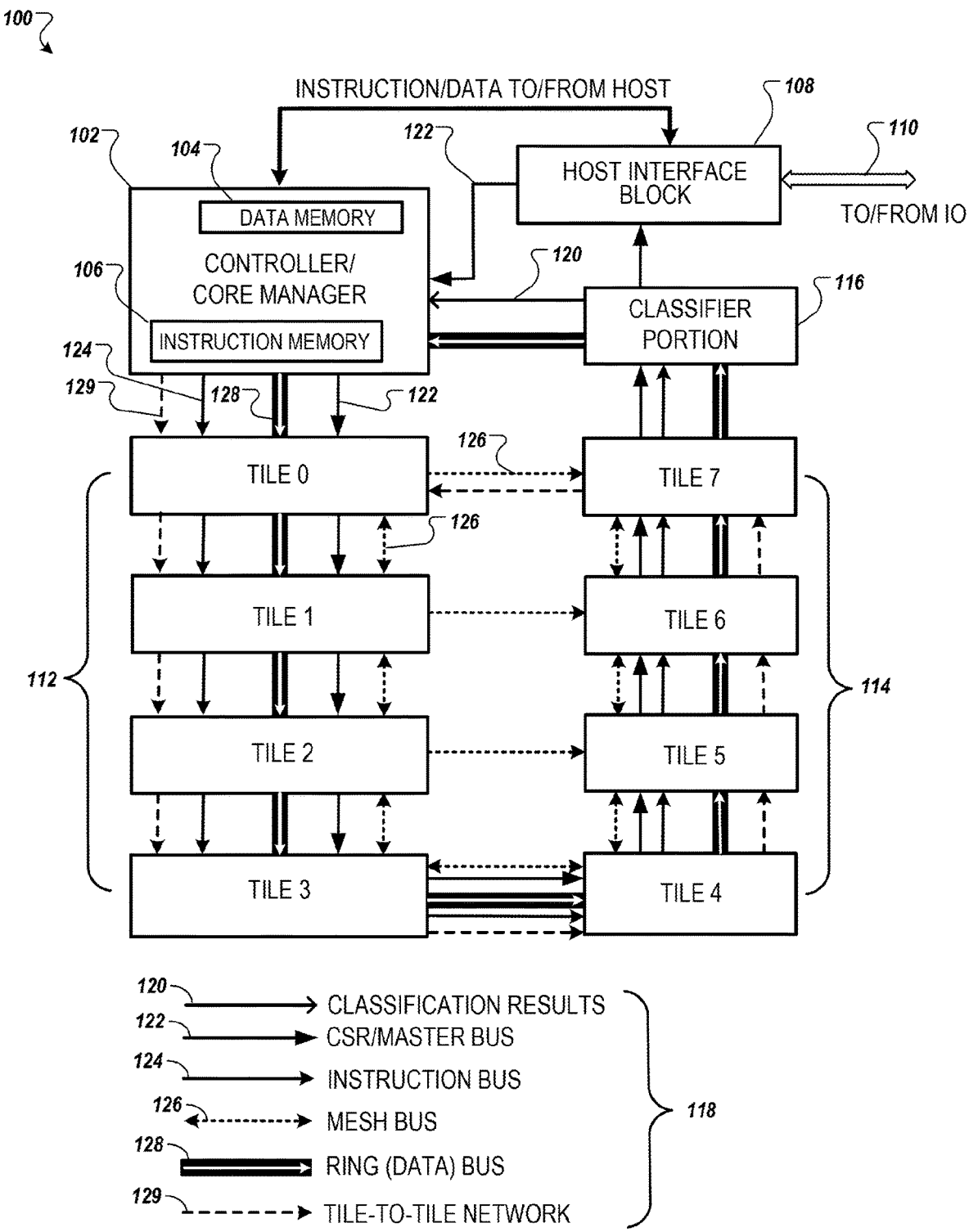
FIG. 1 is a block diagram of an example computation system.

In general, the subject matter described in this specification relates to a hardware computing system including multiple computing units configured to accelerate machine learning workloads, e.g., of a neural network layer. Each computing unit of the hardware computing system is self-contained and can independently execute computations required by a given layer of a multi-layer neural network. Although the systems and techniques are described largely in terms of neural networks, the systems and techniques can be used for other workloads that use tensors as input, such as other deep learning models.

A neural network having multiple layers can be used to compute inferences. For example, given an input, the neural network can compute an inference for the input. The neural network computes this inference by processing the input through each of the layers of the neural network. In particular, the layers of the neural network each have a respective set of weights. Each layer receives an input and processes the input in accordance with the set of weights for the layer to generate an output.

Therefore, in order to compute an inference from a received input, the neural network receives the input and processes it through each of the neural network layers in order to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a sequence. In other implementations, the layers are arranged in a directed graph. That is, any particular layer can receive multiple inputs, multiple outputs, or both. The layers of the neural network can also be arranged such that an output of a layer can be sent back as an input to a previous layer.

The hardware computing system described in this specification can perform the computation of a neural network layer by distributing tensor computations across multiple compute tiles. Each compute tile, which is also referred to as a "tile" for brevity, is an individual computing unit that cooperates with other tiles in the system to accelerate computations across one or more layers of a multi-layer neural network. A computation process performed within a neural network layer may include a multiplication of an input tensor including input activations with a parameter tensor including weights. The computation can include multiplying an input activation with a weight on one or more cycles and performing an accumulation of a products over many cycles.

A tensor is a multi-dimensional geometric object and example multi-dimensional geometric objects include matrices and data arrays. In general, a software algorithm is executed by a compute tile to perform tensor computations by processing a nested loop to traverse an N-dimensional tensor. In one example computational process, each loop may be responsible for traversing a particular dimension of the N-dimensional tensor. For a given tensor construct, a compute tile may require access to an element of a particular tensor to execute dot product computations associated with the tensor. Computation occurs when an input activation provided by a memory structure, e.g., a narrow memory structure, is multiplied with a parameter or weight provided by a memory structure, e.g., a wide memory structure. Because the tensor is stored in a memory, a set of tensor indices may require translation to a set of memory addresses. In general, a tensor traversal unit of a compute tile executes control operations that provide the index of each dimension associated with the tensor and order in which index elements are traversed to perform computations. Tensor computations end when multiplication results are written to an output bus and stored in memory.

To distribute the tensor computations across multiple compute tiles, the tensor can be partitioned into multiple tensor slices (which are also tensors, e.g., sub-tensors) across one or more of the dimensions of the tensor. For example, a tensor can have a shape of [5][4][4][8] for dimensions [w, y, x, z]. In this example, they and x dimensions may be the tiled dimensions along which the tensor is partitioned. If the tensor is being distributed to tiles in a 4×2 arrangement with a total of eight tiles, each tile can receive a tensor slice with a shape of [5][1][2][8]. Each tile can then perform tensor computations using the tensor elements of its tensor slice.

In some cases, a tensor may be reshaped prior to performing additional computations or the partitioning scheme (e.g., the dimensions across which the tensor is tiled) can change based on the machine learning model. For example, the shape of the [5][4][4][8] tensor can be changed to a [5][8][2][8] tensor having the same total number of tensor elements (640 in this example). Based on the new shape or the different tiled dimensions, the tensor elements may need to be redistributed among the tiles so that each tile has one or more tensor slices along the tiled dimension(s). In this example reshaping, the tensor slices would now be [5][2][1][8]. Due to the new tensor slices, the tensor elements for each tile (or for at least some tiles) may be different, requiring redistribution of at least some of the tensor elements.

To reduce the number of hardware instructions needed to manage the redistribution, each tile can use loop nests to traverse the tensor elements previously owned by the tile and to send the tensor elements to other tiles. Similarly, each tile can use loop nests to traverse the tensor elements that it receives in the redistribution and to store the tensor elements in local memory of the tile. Using such loop nests obviates the need for a large number of instructions for orchestrating the redistribution of the tensor elements.

Global linearized index values can be used by the tiles to determine which tile owns the tensor element before and after reshaping or a change in tiled dimension(s). Each tensor element can be associated with (e.g., assigned) a global linearized index value that is based on a multi-dimensional index of the tensor element in the tensor prior to redistribution, e.g., based on the multi-dimensional index of the tensor element in the original tensor prior to any redistribution operations. In some implementations, the global linearized index value for the tensor element remains the same no matter how many redistributions occur.

The multi-dimensional index can include, for each dimension of the tensor, an index value that corresponds to a position of the tensor element along that dimension of the tensor. For example, the multi-dimensional index for a tensor element at w=2, y=1, x=3, and z=4 can be 2134. As described in more detail below, the tiles can translate these indices of the multi-dimensional index into the global linearized index value for the tensor element and use the global linearized index value to determine which tile to send the tensor element and/or from which tile a tensor element will be (or was) received. The global linearized index value for each element is the same before and after the redistribution, e.g., even if the redistribution occurs in response to a reshaping of the tensor.

FIG. 1 shows a block diagram of an example computation system 100. The system 100 can accelerate tensor computations associated with deep neural networks (DNNs) or other deep learning models. The system 100 generally includes a controller 102, a host interface 108, an input/output (I/O) link 110, multiple tiles including a first tile set 112 and a second tile set 114, a classifier portion 116, and data buses identified in a bus map 118 (which is shown for clarity, but is not included in the system 100). Controller 102 generally includes data memory 104, instruction memory 106, and at least one processor configured to execute one or more instructions encoded in a computer readable storage medium. Instruction memory 106 may store one or more machine readable instructions that are executable by the one or more processors of controller 102. Data memory 104 may be any of a variety of data storage mediums for storing and subsequently accessing a variety of data relating to computations that occur within system 100.

Controller 102 is configured to execute one or more instructions relating to tensor computations within system 100, including instructions stored in instruction memory 106. In some implementations, data memory 104 and instruction memory 106 are volatile memory unit or units. In some other implementations, data memory 104 and instruction memory 106 are non-volatile memory unit or units. Data memory 104 and instruction memory 106 may also be another form of computer-readable medium, such as a floppy disk device, a hard disk device, an optical disk device, or a tape device, a flash memory or other similar solid state memory device, or an array of devices, including devices in a storage area network or other configurations. In various implementations, controller 102 may also be referenced or referred to as core manager 102.

As depicted, host interface 108 is coupled to I/O link 110, controller 102, and classifier portion 116. Host interface 108 receives instructions and data parameters from I/O link 110 and provides instructions and parameters to controller 102. In general, instructions can be provided to one or more devices in system 100 through instruction bus 124 (described below) and parameters can be provided to one or more devices in system 100 through ring bus 128 (described below). In some implementations, instructions are received by controller 102 from host interface 118 at an initial time and stored in instruction memory 106 for execution by controller 102 at a later time.

Classifier portion 116 is likewise coupled to controller 102 and tile 7 of second tile set 114. In some implementations, classifier portion 116 is implemented as a separate tile within the system 100. In alternative implementations, classifier portion 116 is disposed or located within controller 102 as a sub-circuit or sub-device of controller 102. Classifier portion 116 is generally configured to perform one or more functions on accumulated pre-activation values that are received as outputs of fully connected layers. Fully connected layers may be partitioned across the tiles in tile sets 112 and 114. Thus, each tile is configured to produce a subset of pre-activation values (i.e., linear outputs) which may be stored in a memory unit(s) of the tile. Classification results bus 120 provides a data path from classifier portion 116 to controller 102. Data that includes post-function values (i.e., results) are provided to controller 102 from classifier portion 116 via classification results bus 120.

Bus map 118 shows data buses that provide one or more inter-connected data communication paths between tiles of first tile set 112 and second tile set 114. Bus map 118 provides a legend for identifying a classification results bus 120, CSR/master bus 122, instruction bus 124, mesh bus 126, ring bus 128, and a tile-to-tile network 129, as depicted in FIG. 1. In general, a tile is a core component within the accelerator architecture of system 100 and is the focal point for tensor computations that occur in the system. Each tile is an individual computing unit that cooperates with other tiles in the system to accelerate computations across one or more layers of a multi-layer neural network. Although tiles in tile sets 112, 114 can share execution of tensor computations associated with a given instruction, an individual computing unit is a self-contained computational component configured to execute a subset of tensor computations independently relative to other corresponding tiles within tile sets 112, 114.

CSR bus 122 is a single master multiple slave bus that enables controller 102 to transmit one or more instructions that set program configurations and read status registers associated with one or more tiles. CSR bus 122 may be connected in a single daisy chain configuration with one master bus segment and multiple slave bus segments. As shown in FIG. 1, CSR bus 122 provides communications coupling through a bus data path that connects tiles in tile sets 112, 114 and controller 102 in a ring to host interface 110. In some implementations, host interface 110 is the single master of the CSR bus ring and the entire CSR bus address space is memory mapped to a memory space in host interface 110.

CSR bus 122 may be used by host interface 110 to perform one or more operations including, for example, programming memory buffer pointers in controller 102 to enable controller 102 to begin fetching instructions from instruction memory 106, updating/programming various tile settings (e.g., coefficient tables for polynomial approximation calculations) that remain static during one or more computations, and/or loading/reloading firmware to classification portion 116. In one example, firmware reloads may include new functions to be applied to linear outputs (i.e., pre-activation values). Accordingly, every slave having access to CSR bus 122 will have a distinct node identifier (node ID) that is tied to the slave and identifies it. The node ID will be part of an instruction address and will be used, inspected or otherwise examined by the CSR slaves (i.e., controller 102, tiles 112, 114 and classifier 116) to determine whether the CSR packet is addressed to the slave.

In some implementations, one or more instructions can be transmitted by host interface 110 through controller 102. The instructions may, for example, be 32-bits wide with the first 7-bits including header information indicating the instruction address/destination that is to receive and execute the instructions. The first 7-bits of the header may contain data parameters that represent a particular node ID. Slaves (e.g., each tile) on the CSR bus ring may therefore inspect the header of the instruction to determine if the request by the master (host interface 110) was addressed to the tile inspecting the header. If the node ID of the header does not indicate that the destination is the inspecting tile, the inspecting tile will copy the input CSR instruction packet to the CSR bus input connected to the next tile for inspection by the next tile.

Instruction bus 124 originates from controller 102 and, similar to CSR bus 122, also provides communications coupling through a bus data path that connects tiles in tile sets 112, 114 in a ring back to controller 102. In one implementation, controller 102 broadcasts one or more instructions via instruction bus 124. The instructions that are broadcast by controller 102 may differ from the instructions provided via CSR bus 122. However, the manner in which a tile receives and/or consumes or executes the instruction received via bus 124 may be similar to the process for executing instructions received via CSR bus 122.

In one example, a header (i.e., a bitmap) of the instruction indicates, to a receiving tile, that the receiving tile needs to consume a particular instruction based on a bitmap associated with the instruction. The bitmap may have a particular width defined in terms of bits. The instruction is typically forwarded from one tile onto the next tile based on parameters of the instruction. In one implementation, the width of instruction bus 124 may be configured to be smaller than the size/width of the instruction. Thus, in such a configuration, transmission of the instructions will be over several cycles and bus stops of instruction bus 124 will have decoders to place instructions received at the tile in the appropriate target instruction buffer associated with that tile.

As described further below, the tiles in tile sets 112, 114 are generally configured to support two broad categories of instructions. The two broad categories may also be referred to as instruction types. The instruction types include a tensor operation (TensorOp) instruction and a direct memory access (DMAOp) instruction. In some implementations, DMAOp instructions have one or more specializations that are allowed to be concurrent. The one or more specializations may be referred to as DMAOp instruction subtypes or opcodes. In some cases, every unique and/or valid DMAOp instruction type/subtype tuple will have a separate instruction buffer within a particular tile.

At a particular tile of tiles 112, 114, the bus stop associated with instruction bus 124 will examine the header bitmap to determine the instruction type/subtype. The instruction may be received by the tile and subsequently written to an instruction buffer of the tile prior to execution of the instruction by the tile. The instruction buffer of the tile in which the instruction is written to may be determined by the type and subtype indicator/field of the instruction. The instruction buffers may include a first-in first-out (FIFO) control scheme that prioritizes consumption of one or more related instructions. Thus, under this FIFO control scheme, instructions of the same type/subtype will always be executed in the order in which the instruction arrived on the instruction bus.

The different instruction buffers within a tile are the TensorOp instruction buffers and the DMAOp instruction buffers. As indicated above, instruction types include the TensorOp instruction and the DMAOp instruction. With regard to DMAOp instructions, instruction subtypes (indicating a 'write-to' buffer location) include the following: 1) mesh inbound instruction buffer; 2) mesh outbound instruction buffer; 3) narrow-wide DMA instruction buffer; 4) wide-narrow DMA instruction buffer; and 5) ring bus DMA instruction buffer. These buffer locations will be described in more detail below with reference to FIG. 2. Wide and narrow designations are used throughout the specification and generally refer to an approximate size in width (bits/bytes) of one or more memory units. As used herein, "narrow" may refer to one or more memory units each having a size or width of less than 16-bits and "wide" may refer to one or more memory units each having a size or width of less greater than 16-bits but, in some implementations, less than 64-bits.

Mesh bus 126 provides a data communications path that is distinct from CSR bus 122, instruction bus 124, and ring bus 128 (described below). As depicted in FIG. 1, mesh bus 126 provides a communications path that couples or connects each tile to its corresponding neighbor tile in both the X and Y dimensions. In various implementations, mesh bus 126 may be used to transport input activation quantities between one or more narrow memory units in adjacent tiles.

As shown, mesh bus 126 does not allow direct forwarding of input activation data to non-adjacent tiles.

In various implementations, mesh bus 126 and the various tiles connected via mesh bus 126 may have the following configuration. Four corner tiles of the mesh have two outbound ports and two inbound ports. Four edge tiles of the mesh have three inbound ports and three outbound ports. All non-edge, non-corner tiles have four inbound ports and four outbound ports. In general, given an example N×N tile layout, edge tiles are tiles with only three neighbor tiles while corner tiles are tiles with two neighbor tiles. Regarding data flow methodology via mesh bus 126, in general, every input activation that arrives via mesh bus 126 for a particular tile must be committed to one or more narrow memory units of the tile. Moreover, for tile configurations that have fewer than four inbound ports, DMAOp instructions may write zero values to the locations in the tile's narrow memory instead of waiting for data on an absent input port. Likewise, for tile configurations that have fewer than four outbound ports, DMAOp instructions will not execute the narrow memory reads and port writes related to transfers for any absent ports.

In some implementations, a location or address of a narrow memory unit(s) that a particular input activation will be written to, or read from, will be generated by a Tensor Traversal Unit (hereinafter "TTU") based on inbound/outbound DMAOp provided via mesh bus 126. An inbound DMAOp and an outbound DMAOp may be executed concurrently and any required synchronization will be managed through sync flag control schemes administered by controller 102. TTUs are described in further detail below with reference to FIG. 2 and FIG. 3.

Ring bus 128 originates from controller 102 and, similar to CSR bus 122 and instruction bus 124, also provides communications coupling through a bus data path that connects tiles 112, 114 in a ring back to controller 102. In various implementations, ring bus 128 generally connects or couples all wide memory units (described in more detail below with reference to FIG. 2) in all tiles 112, 114. Thus, a payload width of ring bus 128 corresponds to the width of the wide memory units disposed within each tile of tile sets 112, 114. As discussed above, ring bus 128 also includes a bitmap header indicating the tiles that need to consume payload data comprising instructions or parameters communicated via ring bus 128.

With regard to data (i.e., payload) received at a particular tile via ring bus 128, in response to receiving the information, each tile will zero (i.e., clear out) position data indicated in the bitmap header that is unique to the receiving tile before forwarding the data on to another tile. Hence, when the header bitmap has no remaining bit set data indicating a particular tile that is to receive the payload, forwarding of the payload to another tile will stop. Payload data generally refers to activations and weights used by one or more tiles during tensor computations performed based on execution of deeply nested loops.

In some implementations, controller 102 may be described as being a part of ring bus 128. In one example, for DMAOp instructions executed within a particular tile, controller 102 may be used to pop the data/payload from ring bus stops and forward the payload to a ring bus stop in a next tile in the ring. Controller 102 may also cause the payload data to be committed to one or more wide memory units of the tile if such action is required by instructions in the bitmap header. The address of the one or more wide memory units to which the data needs to be written may be generated by DMAOp instructions within the particular tile.

In various implementations, each tile of tile set 112, 114 can either be a producer of payload data or a consumer of payload data. When a tile is a producer of payload data the tile reads the data from one or more of its wide memory units and multicasts the data over ring bus 128 for consumption by one or more other tiles. When a tile is a consumer of payload data the tile receives and writes the data to one or more wide memory units within the tile and forwards the payload data for consumption by one or more other tiles. With regard to movement of payload data via ring bus 128, there typically will only be one producer/master of data on ring bus 128 at any given time. The DMAOp instruction execution order (e.g., FIFO control scheme) in all tiles will ensure there is only one producer/master of data on ring bus 128 at a given time.

In some implementations, controller 102 uses a sync flag control architecture to ensure there is only one producer/master of payload data on ring bus 128 at a given time. In one example, every write by a tile to a ring output will trigger an increment of the corresponding sync flag count. Controller 102 may examine the payload data to determine the number of data chunks or segments that comprise the payload. Controller 102 then monitors execution by the tile to ensure the expected number of data segments are forwarded and/or consumed by the tile before another tile executes in master mode.

An exception to ensuring there is only one producer/master of data on ring bus 128 at a given time occurs when there are local multicast groups connected via ring bus 128 that do not have an overlapping region on the ring bus. For example, tile 0 (master) may multicast (i.e., produce data) to a tile in Tile 0-Tile 3 grouping, while Tile 4 (master) may do the same to a tile in Tile 4-Tile 7 grouping. An important requirement of this dual master multicast methodology is that different multicast groups must not be allowed to see each other's data packets because packet overlap may occur and lead to one or more data computation errors.

Tile-to-tile network 129 provides a data communications path that is distinct from CSR bus 122, instruction bus 124, mesh bus 126, and ring bus 128. Tile-to-tile network 129 provides a communications path that couples or connects each tile to each other tile. Tile-to-tile network 129 is used to transport tensor elements between the tiles, for example, when the shape of the tensor is changed or the tiled dimension(s) for the tensor are changed.

The logical structure of the tile-to-tile network 129 can be described as having N lanes where N is the number of tiles in the system 100. In this example, the tile-to-tile network 129 would have eight lanes as there are eight tiles. In some implementations, each lane has a tile as a master and each tile masters exactly one lane. The master tile writes data to its lane, while every tile including the master tile reads the lane, copying and buffering data destined for it. Traffic on a lane not destined for a tile is not stored by that tile.

Each tile can include a bus stop that forwards traffic that is not destined for that tile and that terminates traffic that is addressed to that tile. The data sent from one tile to another tile on the tile-to-tile network 129 can include the payload and a header that specifies the destination tile. The payload can be the data of an element of the tensor being transferred to the tile based on the change in the tensor shape or partitioning scheme.

Each tile includes a queue for each tile, including itself. For example, tile 0 has eight queues, one for each tile including tile 0. The queue for a particular tile stores the tensor elements received from the particular tile in the order in which the tensor elements were received from the particular tile. As described in more detail below, each tile accesses the queues and stores the tensor elements received from the tiles in local memory.

Figure 4:
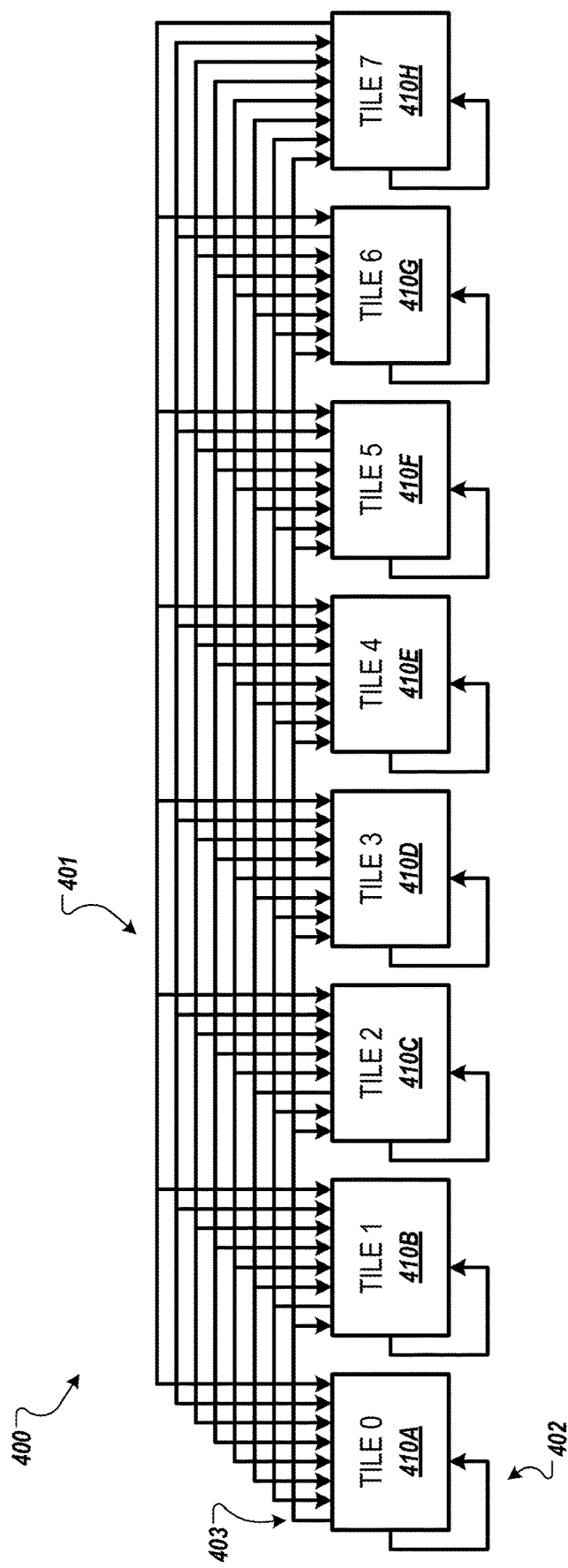
FIG. 4 illustrates an example logical structure of a tile-to-tile network for redistributing tensor slices between compute tiles.
Figure 5:
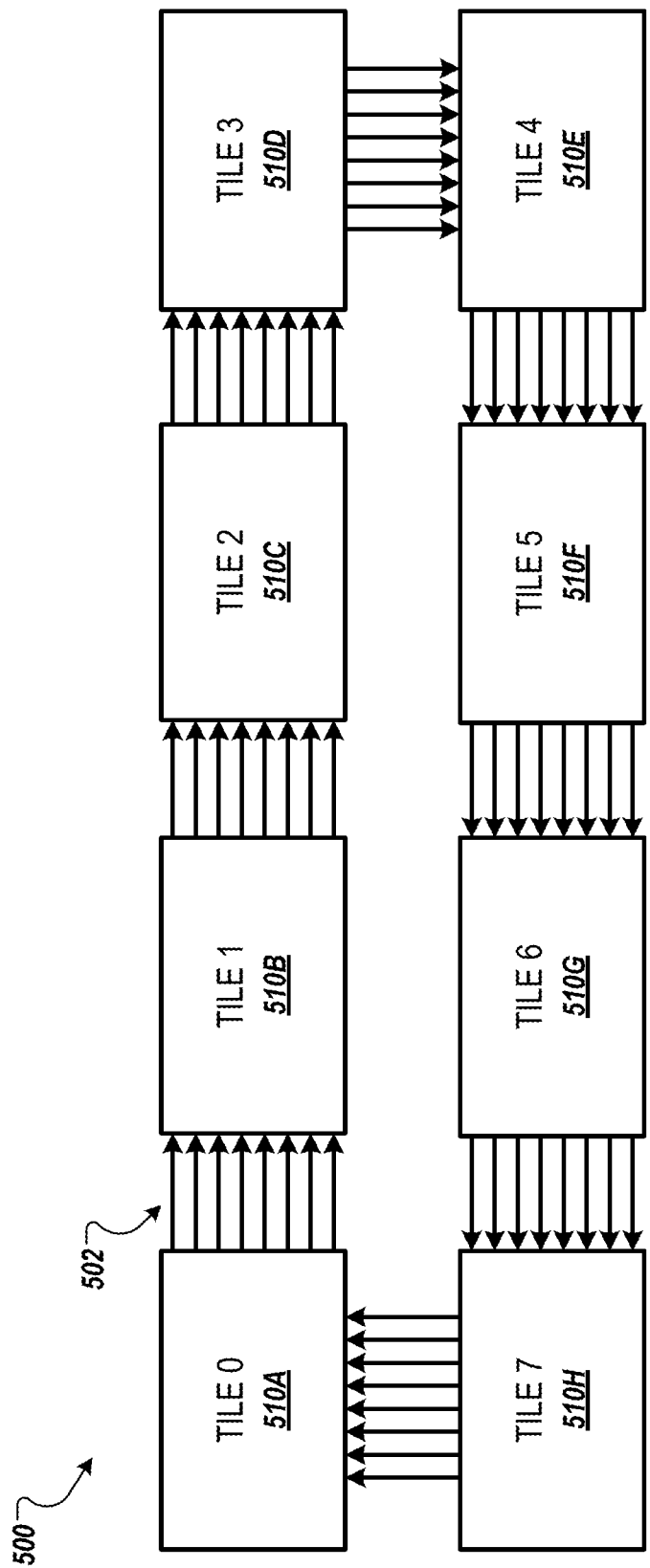
FIG. 5 illustrates an example layout of a tile-to-tile network for redistributing tensor slices between compute tiles.

In some implementations, the width of the tile-to-tile network 129 is NumberOfTiles*CanonicalWidth. The width of the tile-to-tile network 129 can be chosen to retain addressing flexibility and the addressing granularity can match the smallest atomic element width supported by the system 100. Example tile-to-tile network topologies are illustrated in FIGS. 4 and 5, and described below. The parameter NumberOfTiles is the number of tiles in the system 100, which is eight in this example. The parameter CanonicalWidth is the width of a smallest atomic element that will be transmitted over the tile-to-tile network 129. For example, the CanonicalWidth can be eight bits, sixteen bits, or another number of bits corresponding to the smallest atomic element.

As shown in FIG. 1, controller 102 provides a communications data path that couples or connects tiles in tile sets 112, 114 to I/O 110 and includes several core functions. The core functions of controller 102 generally include feeding one or more I/O input activations to tiles in tile sets 112, 114 feeding one or more input activations and parameters received from I/O 110 to the tiles, feeding one or more instructions received from I/O 110 to the tiles, sending I/O output activations to host interface 108, and serving as a ring stop for CSR bus 122 as well as ring bus 128. As described in more detail below, first tile set 112 and second tile set 114 each include multiple tiles that are used to perform one or more tensor computations that are executed based on a deep loop nest that includes inner and outer loops.

System 100 generally operates as follows. Host interface 108 will provide one or more instructions to controller 102 that define direct memory access operations (DMAOp) that occur for a given computation. Descriptors associated with instructions fed to controller 102 will include information required by the controller to facilitate large scale dot product computations associated with multi-dimensional data arrays (tensors). In general, controller 102 receives, from host interface 108, input activations, tile instructions, and model parameters (i.e., weights) for executing tensor computations for a given layer of a neural network. Controller 102 may then cause the instructions to be multicast to tiles 112, 114 in a data flow manner defined by the instruction(s). As discussed above, tiles consuming an instruction may then initiate a broadcast of a new/subsequent instruction to another tile based on bitmap data in the instruction header.

With regard to data flow, input activations and parameters are transmitted to tiles of tile sets 112, 114 via ring bus 128. Each of tiles 112, 114 will store a subset of the input activations needed to compute a subset of output activations that are assigned to that particular tile. DMAOp instructions for a tile will cause the input activation to be moved from wide memory to narrow memory. Computation within a tile begins when required input activations, parameters/weights and computation instructions (TTU operations, memory addresses, etc.) are available in the tile. Computations occurring within a tile ends when MAC operators (described below) within a tile complete all dot product operations defined by the instruction set and pre-activation functions are applied to the results (i.e., output activations) of the multiplication operations.

Results of the one or more tensor computations include writing output activations of a compute layer to a narrow memory unit(s) of the tile performing the computation. For certain tensor computations, there will be a transfer of output edge activations to neighboring tiles via mesh bus 126. Transfer of output edge activations to neighboring tiles are required to compute output activations for a subsequent layer when computations span multiple layers. When computations for all layers are complete, a DMAOp will move final activations to classifier tile 116 through ring bus 128. Controller 102 will then read final activations from classifier tile 116 and execute a DMAOp to move the final activations to host interface 108. In some implementations, classifier portion 116 performs computations of an output layer (i.e., the last layer) of the NN. In other implementations, the output layer of the NN is one of classifier layer, a regression layer, or another layer type that is generally associated with neural networks.

Controller 102 can generate and maintain partitioning data, e.g., in the form of a table, that specifies the tensor elements owned by each tile. As described above, the tensor elements of the tensor can be distributed among the tiles by partitioning the tensor across one or more tiled dimensions. The partitioning data can specify, for each tile, the range of each tiled dimension owned by that tile. For example, as described above, a tensor with a shape of [5][4][4][8] for dimensions [w, y, x, z] can be tiled along the [y] and [x] dimensions such that each tile receives a tensor slice with a shape of [5][1][2][8]. In this example, the partitioning data can specify the ranges of tensor elements along the x and y dimensions owned by each tile as shown in Table 1 below. Although Table 1 includes the ranges for dimensions w and z, the partitioning data may not include the ranges for the non-tiled dimensions as they are the same for each tile.

TABLE 1

| Tile | W | Y | X | Z |
| --- | --- | --- | --- | --- |
| 0 | 0-4 | 0 | 0-1 | 0-7 |
| 1 | 0-4 | 1 | 0-1 | 0-7 |
| 2 | 0-4 | 2 | 0-1 | 0-7 |
| 3 | 0-4 | 3 | 0-1 | 0-7 |
| 4 | 0-4 | 3 | 2-3 | 0-7 |
| 5 | 0-4 | 2 | 2-3 | 0-7 |
| 6 | 0-4 | 1 | 2-3 | 0-7 |
| 7 | 0-4 | 0 | 2-3 | 0-7 |

In some implementations, the partitioning data specifies, for each tile, the global linearized index value for each tensor element owned by the tile. For example, the partitioning data can specify, for each tile, the global linearized index value for each tensor element in the tensor slice(s) distributed to the tile. The partitioning data can specify the global linearized index value in addition to the dimension data shown in Table 1. In this way, the partitioning data maps the global linearized index values to corresponding to the tile space, e.g., to the tile that owns (or the tile that will receive) the tensor element corresponding to the global linearized index value.

Controller 102 also instructs the tiles to redistribute tensor elements, for example, in response to a change in tensor shape or a change in the tiled dimension(s). For example, controller 102 can receive an instruction from the I/O link 110. The instruction can specify a new shape of the tensor and/or a new partitioning scheme for the tensor among the tiles. The partitioning scheme can include the tiled dimensions and/or the shape of the tensor slices that each tile is to receive.

Controller 102 can generate (or received from the I/O link 110) new partitioning data based on the new shape of the tensor and/or the new partitioning scheme. For example, controller 102 can assign tensor slices to each tile based on the new shape and or new portioning scheme and generate partitioning data (e.g., a partitioning table) that specifies the tensor slices that will be owned by each tile after redistributing the tensor elements. The partitioning data that specifies the tiles that own the tensor elements prior to redistribution is referred to as distribution partitioning data (or a distribution partitioning table) and the partitioning data that specifies the tiles that own the tensor elements after redistribution is referred to as redistribution partitioning data (or a redistribution partitioning table). Both types of partitioning data can specify, for each tile, the global linearized index values of the tensor elements that the tile owns, either before or after redistribution.

Controller 102 provides the distribution partitioning data and the redistribution partitioning data to each tile. In this way, each tile can determine which tile owns each tensor element of the tensor prior to and after redistribution of the tensor elements. Each tile can use the tables along with the global linearized index values for the tensor elements to determine which tile to send tensor elements to during redistribution and to determine from which tile a tensor element was received during redistribution, as described in more detail below.

Figure 2:
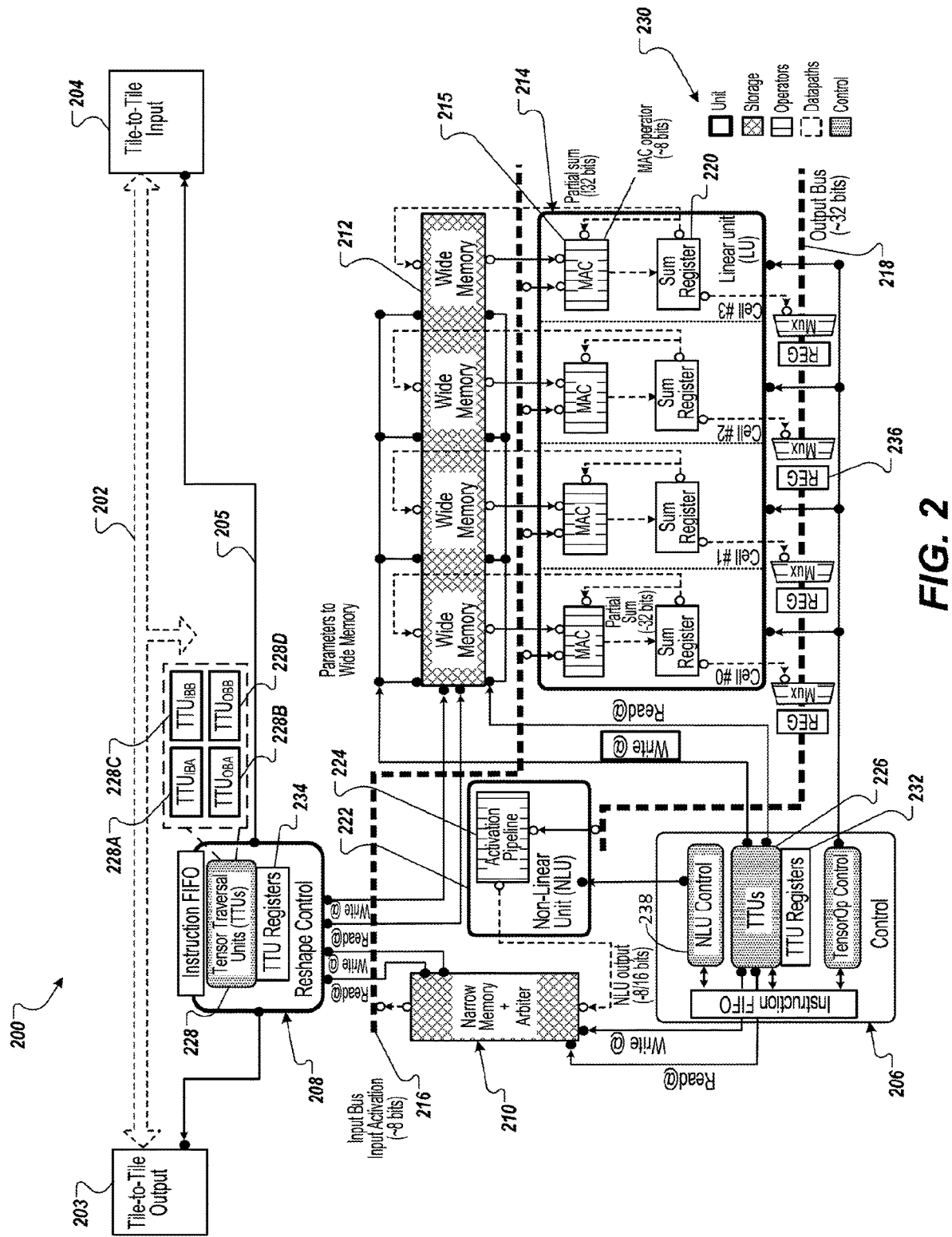
FIG. 2 illustrates an example compute tile.

FIG. 2 illustrates an example compute tile 200. Generally, the example tile 200 may correspond to any of the tiles within first tile set 112 and second tile set 114 discussed above with reference to FIG. 1. In various implementations, compute tile 200 may also be referenced or referred to as computing unit 200. Each compute tile 200 is a self-contained computational unit configured to execute instructions independently relative to other corresponding tiles within tile sets 112, 114. As discussed briefly above, each compute tile 200 executes two types of instructions, a TensorOp instruction and a DMAOp instruction. In general, each instruction type will include compute operations associated with deep loop nests and thus each instruction type will generally execute over multiple time epochs to ensure completion of all loop iterations.

As discussed in more detail below, the different instruction types are executed by independent control units within compute tile 200 that synchronize on data through sync flag controls that are managed within compute tile 200. The sync flag controls manage concurrency between executions of different instruction types within compute tile 200. Each compute operation associated with each instruction type will be executed in strict order of issuance (i.e., First-In First-Out). With regard to the two instruction types, TensorOP and DMAOp, there are no ordering guarantees between these different instruction types and each type is treated by compute tile 200 as a separate thread of control.

With regard to data flow constructs, compute tile 200 generally includes data path 202 and data path 205 that each provide a communications path for data flow into and out of compute tile 200. As described above, system 100 includes four distinct data bus structures that can be laid out, for example, in a ring configuration—CSR bus 122, instruction bus 124, ring bus 128, and tile-to-tile network 129. Referring to FIG. 2, data path 205 corresponds to instruction bus 124, while data path 202 can correspond to one of CSR bus 122, ring bus 128, or tile-to-tile network 129. As shown, the data path 202 corresponds to the tile-to-tile network 202. The data path 202 includes a tile-to-tile output 203 providing an output path for data, e.g., tensor elements, leaving compute tile 200 and a tile-to-tile input 204 providing an input path for data (e.g. tensor elements) entering compute tile 200.

Compute tile 200 further includes a TensorOp control 206 including a TensorOp tensor traversal unit (TTU) 226 and a Reshape control 208 including multiple Reshape control TTUs 228. Although not shown, the compute tile 200 can also include a DMAOp control including a DMAOp TTU arranged similar to the Reshape control 228. An example, compute tile that includes a DMAop TTU is described in U.S. patent application Ser. No. 15/335,769, filed on Oct. 27, 2016 and titled "Neural Network Compute Tile," which is incorporated herein by reference.

TensorOp control 206 generally manages writes to and reads from TensorOp TTU register 232 and administers traversal operations for execution by TensorOp TTU 226. Likewise, DMAOp control generally manages writes to and reads from a DMAOp TTU register and administers traversal operations for execution by a DMAOp TTU. Similarly, Reshape control generally manages writes to and reads from a Reshape TTU register and administers traversal operations for execution by the Reshape control TTUs 228.

TTU register 232 includes instruction buffers for storing one or more instructions comprising operations to be performed by TensorOp TTU 226 upon execution of the instructions by TensorOp control 206. Likewise, DMAOp TTU register can include instruction buffers for storing one or more instructions comprising operations to be performed by DMAOp TTU upon execution of the instructions by DMAOp control. Similarly, Reshape control TTU register 234 can include instruction buffers for storing one or more instructions comprising operations to be performed by Reshape control TTUs upon execution of the instructions by Reshape control.

As described further below, TTUs are used by tile 200 to traverse array elements of one or more tensors that generally reside in narrow memory 210 and wide memory 212. The TTUs are also used to compute the global linearized index value for each tensor element in a global tensor and to determine the multi-dimensional index (e.g., the index value for each dimension of the global tensor) for each tensor element using the global linearized index value for the tensor element.

In some implementations, certain instructions for execution by compute tile 200 arrive at the tile via data path 205 (i.e., a portion of instruction bus 124). Compute tile 200 will examine the header bitmap to determine the instruction type (TensorOp or DMAOp) and the instruction subtype (read operation or write operation). Instruction(s) received by compute tile 200 are subsequently written to a particular instruction buffer depending on the instruction type. In general, instructions are received and stored (i.e., written to the buffer) prior to execution of the instruction by a component of compute tile 200. As shown in FIG. 2, the instruction buffers (i.e., TensorOp TTU register 232 and DMAOp TTU register) may each include a first-in first-out (FIFO) control scheme that prioritizes consumption (execution) of one or more related instructions.

As discussed briefly above, a tensor is a multi-dimensional geometric object and example multi-dimensional geometric objects include matrices and data arrays. An algorithm, including deeply nested loops, may be executed by compute tile 200 to perform tensor computations by iterating one or more nested loops to traverse an N-dimensional tensor. In one example computational process, each loop of the loop nest may be responsible for traversing a particular dimension of the N-dimensional tensor. As described herein, TensorOp control 206 generally administers one or more tensor operations that drive the sequence in which dimensional elements of a particular tensor construct are traversed and accessed to complete computations defined by the deep nested loops.

Compute tile 200 further includes a narrow memory 210 and a wide memory 212. Narrow and wide designations generally refer to a size in width (bits/bytes) of the memory units of narrow memory 210 and wide memory 212. In some implementations, narrow memory 210 includes memory units each having a size or width of less than 16-bits and wide memory 212 includes memory units each having a size or width of greater than 16-bits and less than 64-bits. Generally, compute tile 200 receives input activations via data path 205 and DMA control executes an operation to write the input activations into narrow memory 210. Likewise, compute tile 200 receives parameters (weights) via data path 202 and DMA control executes an operation to write the parameters into wide memory 212. In some implementations, narrow memory 210 can include a memory arbiter typically used in shared memory systems to decide, for each memory cycle, which control device (e.g., TensorOp control 206, DMAOp control, or Reshape control) will be allowed to access that shared memory units of narrow memory 210.

Compute tile 200 further includes an input activation bus 216 and a MAC array 214 including multiple cells that each include a MAC operator 215 and a sum register 220. In general, MAC array 214 executes, using MAC operators 215 and sum registers 220 across multiple cells, tensor computations that include arithmetic operations relating to dot product computations. Input activation bus 216 provides a data path in which input activations are provided, by narrow memory 210, one-by-one for respective access by each MAC operator 215 of MAC array 214. Hence, based on the one-by-one broadcast of an input activation, a single MAC operator 215 of a particular cell will each receive an input activation. Arithmetic operations performed by the MAC operators of the MAC array 214 generally include multiplying an input activation provided by narrow memory 210 with a parameter accessed from wide memory 212 to produce a single output activation value.

During arithmetic operations, partial sums may be accumulated and stored in a corresponding, e.g., sum register 220, or written to wide memory 212 and re-accessed by a particular cell of MAC array 214 to complete follow-on multiply operations. The tensor computations can be described as having a first portion and second portion. The first portion is complete when multiply operations produce an output activation, for example, by completing a multiplication of an input activation and a parameter to generate the output activation. The second portion includes application of a non-linear function to an output activation and the second portion is complete when the output activation is written to narrow memory 210 after application of the function.

Compute tile 200 further includes an output activation bus 218, a non-linear unit (NLU) 222 comprising an output activation pipeline 224, an NLU control 238, and a reference map 230 that indicates a core attribute of a component in compute tile 200. Reference map 230 is shown for clarity, but is not included in the compute tile 200. Core attributes include whether a particular component is a unit, a storage device, an operator, a control device or a data path. In general, upon completion of the first portion of the tensor computations, output activations are provided from MAC array 214 to NLU 222 via output activation bus 218. After arrival at NLU 222, data specifying an activation function, received via activation pipeline 224 is applied to the output activations and the output activations are then written to narrow memory 210. In some implementations, output activation bus 218 includes at least one pipelined shift register 236 and completing the second portion of the tensor computations includes using a shift register 236 of activation bus 218 to shift output activations toward narrow memory 210.

With regard to dot product computations of, for example, two multi-dimensional data arrays, for a single compute tile 200, MAC array 214 provides robust single instruction multiple data (SIMD) functionality. SIMD generally means that all parallel units (multiple MAC operators 215) share the same instruction (based on the deep loop nest), but each MAC operator 215 executes the instruction on different data elements. In one basic example, adding the arrays [1, 2, 3, 4] and [5, 6, 7, 8] element-wise to obtain the array [6, 8, 10, 12] in one cycle will typically require four arithmetic units to execute the operation on each element. By using SIMD, the four units can share the same instruction (e.g., "add") and perform computations in parallel. Thus, system 100 and compute tile 200 provides enhanced acceleration and parallelism in tensor computations over prior methods.

In one example, and as described in more detail below, a single instruction can be provided by controller 102 to multiple compute tiles 200 (see tile sets 112, 114 of FIG. 1) for consumption by multiple MAC arrays 214. In general, neural network layers can include multiple output neurons and the output neurons can be partitioned such that tensor computations associated with a subset of output neurons can be assigned to a particular tile of tile sets 112, 114. Each tile of tile sets 112, 114 can then perform related tensor computations on different groups of neurons for a given layer. Compute tile 200 can therefore provide at least two forms of parallelism: 1) one form includes partitioning the output activations (corresponding to the subset of output neurons) amongst the multiple tiles of tile set 112, 114; and 2) another form includes simultaneous computation (with a single instruction) of multiple subsets of output neurons based on the partitioning amongst the tiles of tile sets 112, 114.

During redistribution of tensor elements among the tiles, the Reshape control 208 sends tensor elements to the tiles on the tile-to-tile network 129 and receives tensor elements from tiles on the tile-to-tile network 129 (represented by the data path 202 in FIG. 2). Prior to redistribution, the tile 200 owns (e.g., stores and/or performs computations using) tensor slices of a tensor that were previously distributed to the tile 200. Each other tile of the computation system 100 also owns tensor slices of the tensor. The tensor elements of the tensor slices owned by a tile are stored in local memory (e.g., in narrow memory 210 and wide memory 212) of that tile.

The Reshape control 208 can send, to the tiles (e.g., the other tiles and the tile 200), the tensor elements that were previously distributed to the tile 200. For example, rather than determine which tensor elements will remain at the tile 200 and which tensor elements will need to be transferred to a different tile based on the new shape or new partitioning scheme, each tile of the computation system 100 can send each tensor element owned by the tile to the tile that will own the tensor element based on the new shape or new partitioning scheme (which can for one or more tensor elements be the tile that currently owns the tensor element(s)).

The Reshape control 208 can use the TTUs to traverse the tensor elements when sending and receiving tensor elements. For example, when sending tensor elements to the tiles, the Reshape control 208 can use outbound TTU 228B and outbound TTU 228D to traverse the tensor elements that are currently owned by the tile 200 and to send these tensor elements to the tiles. When receiving tensor elements from the tiles, the Reshape control 208 can use inbound TTU 228A and inbound TTU 228C to traverse the tensor elements.

Both outbound TTUs 228B and 228D can traverse the tensor elements owned by the tile 200 in the same order based on the global linearized index values of the tensor elements, e.g., from lowest global linearized index value to the highest global linearized index value. The outbound TTUs 228B and 228D can use the partitioning data to determine the tensor elements owned by the tile 200 and the order.

Both TTUs 228B and 228D can iterate a same loop nest that traverses the tensor elements, but performs a different computation for each iteration of an inner loop of the loop nest. One outbound TTU 228B can compute the global linearized index value for the tensor element and the other outbound TTU 228D can compute the local memory address of the tensor element in the local memory of the tile 200. By computing the global linearized index value, the tile 200 can use the redistribution partitioning data to determine which tile to send each tensor element.

The loop nest can be configured based on the dimensions of the tensor slice(s) owned by the tile 200 and the partitioning scheme for the tensor prior to redistribution. The loop nest can include a loop for each dimension. The loop for a dimension traverses the dimension. The stride for each loop is also based on the dimensions of the tensor slice(s) owned by the tile 200 and the partitioning scheme for the tensor prior to redistribution.

As an example, consider a three dimensional tensor with dimensions [Y, X, Z] and that is partitioned across the x and y dimensions and there is a tiling strategy used on the z dimension such that the z dimension is split into Z and ZZ. The dimensions of the local tensor slice owned by tile 200 is [Y', X', Z]. A nested loop for determining the global linearized index value for each tensor element can be:
for zz in range (ZZ), stride=Z:
  for y in range (Y'), stride=X*ZZ*Z:
    for x in range (X'), stride=Z*ZZ:
      for z in range (Z), stride=1:
        global linearized index value=zz+y+x+z+base value For the global linearized index value computation, the parameter zz= is the loop index for zz, the parameter y is the loop index for y, the parameter x is the loop index for x, and the parameter z is the loop index for z. The loop indexes are also equal to the index of that dimension in the tensor for the tensor element for which the global linearized index value is being computed. The base value is a base global linearized index value for the tensor element owned by the tile 200. In some implementations, the base value is equal to (start_minor_dimension*local_partition.tiled_minor_elements)+(start_major_dimension*local_partition.tiled_major_elements). The parameter "start_minor_dimension" is the starting index of the most-minor tiled dimension. The parameter "local_partition.tile_minor_elements" is the cardinality of the tiled minor dimension for the current tensor partitioning, and can be equal to the product of the cardinality of all dimensions more minor than this dimension. The parameter "start_major_dimension" is the starting index of the major tiled dimension. The parameter "local_partition.tile_major_elements" is the cardinality of the tiled major dimension for the current tensor partitioning, and can be equal to the product of the cardinality of all dimensions more minor than this dimension. Collectively, these are loop tiling formulation that is based on the current tiling of the tensor.

Similarly, a nested loop for determining the local memory address of the tensor elements owned by the tile can be:
for zz in range (ZZ), stride=Z:
  for y in range (Y'), stride=X*ZZ*Z:
    for x in range (X'), stride=Z*ZZ:
      for z in range (Z), stride=1:
        local address=zz+y+x+z+base address As described above, the parameter zz= is the loop index for zz, the parameter y is the loop index for y, the parameter x is the loop index for x, and the parameter z is the loop index for z. The base address is a starting memory address for the tensor slice in local memory of the tile 200.

As shown above, the loops of the loop nests are the same for the global linearized index value and the local memory address. The TTUs 228B and 228D can iterate the loops in parallel with each other and output the global linearized index value and the local memory address for each tensor element to the Reshape Control 208.

The Reshape Control 208 can use the local memory address to obtain the tensor element from local memory. The Reshape control 208 can use the global linearized index value for the tensor element and the redistribution partitioning data to determine the destination tile to which the tensor element is to be transferred. For example, the redistribution partitioning data can specify, for each compute tile, the global linearized index values for the tensor elements that will be owned by the compute tile after redistribution.

In some implementations, the Reshape control 208 can use the global linearized index value for the tensor element (which is the same before and after redistribution) and a partitioning scheme to determine the index of the tensor element on each tiled dimension. This partitioning scheme can be a new partitioning scheme if the tensor elements are being redistributed based on a change in partitioning scheme for the tensor. If the tensor is being redistributed in response to the shape of the tensor changing and the partitioning scheme for the tensor remains the same, the partitioning scheme used to determine the index of the tensor element on each tiled dimension can be the same partitioning scheme used to distribute the tensor elements prior to the redistribution.

The Reshape control 208 can then compare the index of the tensor element on each tiled dimension to the redistribution partitioning data to determine which tile to send the tensor element. For example, as described above, the redistribution partitioning data can specify a range of index values for each tile. The Reshape control 208 can compare, for each tiled dimension, the index value for the tensor element on that dimension to the redistribution partitioning data. If the index value is within the range specified for a tile for each tiled dimension, the Reshape control 208 can determine that the tensor element is to be transferred to that tile.

For each tensor element, the Reshape control 208 can send data on its lane of the tile-to-tile network 129. This data can include, as the payload, the tensor element obtained from local memory. This data can also include a header that specifies the destination tile for the tensor element as determined by the Reshape control 208.

The Reshape control 208 can send the tensor elements on its lane of the tile-to-tile network 129 in order as the TTUs 228B and 228D traverse the tensor slice(s) owned by the tile 200. Each other tile of the computation system 100 can similarly traverse their respective tensor slice(s) and send tensor elements to the other tiles on their lanes of the tile-to-tile network 129. In some implementations, the Reshape control 208 can send the tensor elements in order based on the global linearized index values, e.g., from lowest to highest global linearized index value.

As described above, each tile can include a queue for each tile of the computation system 100. Each queue can store the tensor elements received from the corresponding tile in the order in which the tensor elements were received by the queue. For example, if tile 0 received three tensor elements from tile 1, the queue for tile 1 on tile 0 would store the three tensor elements in the order in which the tensor elements were received.

The Reshape control 208 of each tile can then re-layout the tensor elements stored in the queues in local memory to build the tensor slices that the tile owns after redistribution. The tensor elements of a tensor slice are stored in local memory based on the index values of the tensor elements for each dimension of the tensor. For example, as described below, a TTU can translate the tensor indices into memory addresses for storing and retrieving the tensor elements.

The Reshape control 208 can use the output of two inbound TTUs 228A and 228C to sample the tensor elements in the queues and store the tensor elements in the appropriate memory storage locations. As the tensor elements are not transferred with their global linearized index values, the order in which the tensor elements are sampled is important to ensure that the appropriate tensor element is stored in the appropriate memory location.

The Reshape control 208 can use the inbound TTUs 228A and 228C to traverse the tensor slice(s) of the tensor that the tile 200 will own after redistribution. Both TTUs 228A and 228C can traverse the tensor elements of the tensor slice(s) in the same order. For example, the TTUs 228A and 228C can traverse the tensor elements in order based on the global linearized index values, e.g., from lowest to highest, or otherwise in the same order as the outbound TTUs 228B and 228D.

In some implementations, the TTUs 228A and 228C traverse the tensor elements in order based on the dimensions of the tensor slice(s) that the tile 200 will own after redistribution. For example, both TTUs can iterate a same loop nest that traverses the tensor elements, but performs a different computation for each iteration of an inner loop of the loop nest. One inbound TTU 228A can compute the global linearized index value for the tensor element and the other inbound TTU 228C can compute the local memory address where the tensor element will be stored in the local memory of the tile 200.

The loop nest can be configured based on the dimensions of the tensor slice(s) owned by the tile 200 and the partitioning scheme for the tensor prior to redistribution. The loop nest can include a loop for each dimension. The loop for a dimension traverses the dimension. The stride for each loop is also based on the dimensions of the tensor slice(s) owned by the tile 200 and the partitioning scheme for the tensor prior to redistribution.

To ensure that the tensor elements are sent and received in the correct order, the loops for computing the memory addresses and global linearized index value for the inbound TTUs and the inbound TTUs can both be in ascending order based on the global linearized index values. In this way, the queue for each tile will include tensor elements in order from lowest to highest global linearized index value received from the tile corresponding to the queue.

The Reshape control 208 can use the global linearized index value for each tensor element to determine which tile sent the tensor element to the tile 200. For example, the Reshape control 208 can use the redistribution partitioning data to determine the global linearized index values of the tensor elements being redistributed to the compute tile 200. The Reshape control 208 can also use the partitioning data to determine the compute tile that previously owned the tensor element. This informs the Reshape control which queue to sample for each tensor element.

In some implementations, the Reshape control 208 can use the global linearized index value and the partitioning scheme used to distribute the tensor elements to the tiles prior to redistribution to determine the multi-dimensional address for the tensor element in the original tensor (the tensor before reshaping or change in partitioning scheme). The Reshape control 208 can then compare the index value for the tensor element for each tiled dimension to the distribution partitioning data to determine which tile owned the tensor element prior to redistribution. The Reshape control 208 can then obtain the tensor element from the queues for that tile and store the tensor element in local memory at the memory address determined by the TTU 228C.

The Reshape control 208 can perform the same technique for each tensor element traversed by the TTUs 228A and 228C. For example, at each iteration of the inner loop of the loop nest, the TTUs 228A and 228C can output a global linearized index value and a local memory address, respectively, to the Reshape control 208. The Reshape control 208 can receive this data for each iteration of the inner loop, obtain the tensor element from the queue corresponding to the tile from which the tensor element was received, and store the tensor element in local memory using the local memory address output by the TTU 228C.

Each other tile can traverse its tensor slice(s) in a similar manner. Once each tile has stored its tensor elements in local memory, the redistribution is complete. If the tensor elements are to be redistributed again, e.g., based on another reshaping or change in partitioning scheme, a similar technique can be used to redistribute the tensor elements. In the next redistribution, the previous redistribution data used to redistribute the tensor elements would be the distribution data and new redistribution data would be generated based on the new shape or new partitioning scheme. The DMA Control 208 of each tile can reconfigure its TTUs 228A-228D based on the dimensions of the tensor slices being transferred to/from the tile so that the tensor slices are traversed in the appropriate order and using the appropriate strides. For example, the controller 102 can generate (or receive) the data specifying the configuration of each TTU of each tile and provide that data to the Reshape control of each tile.

Figure 3:
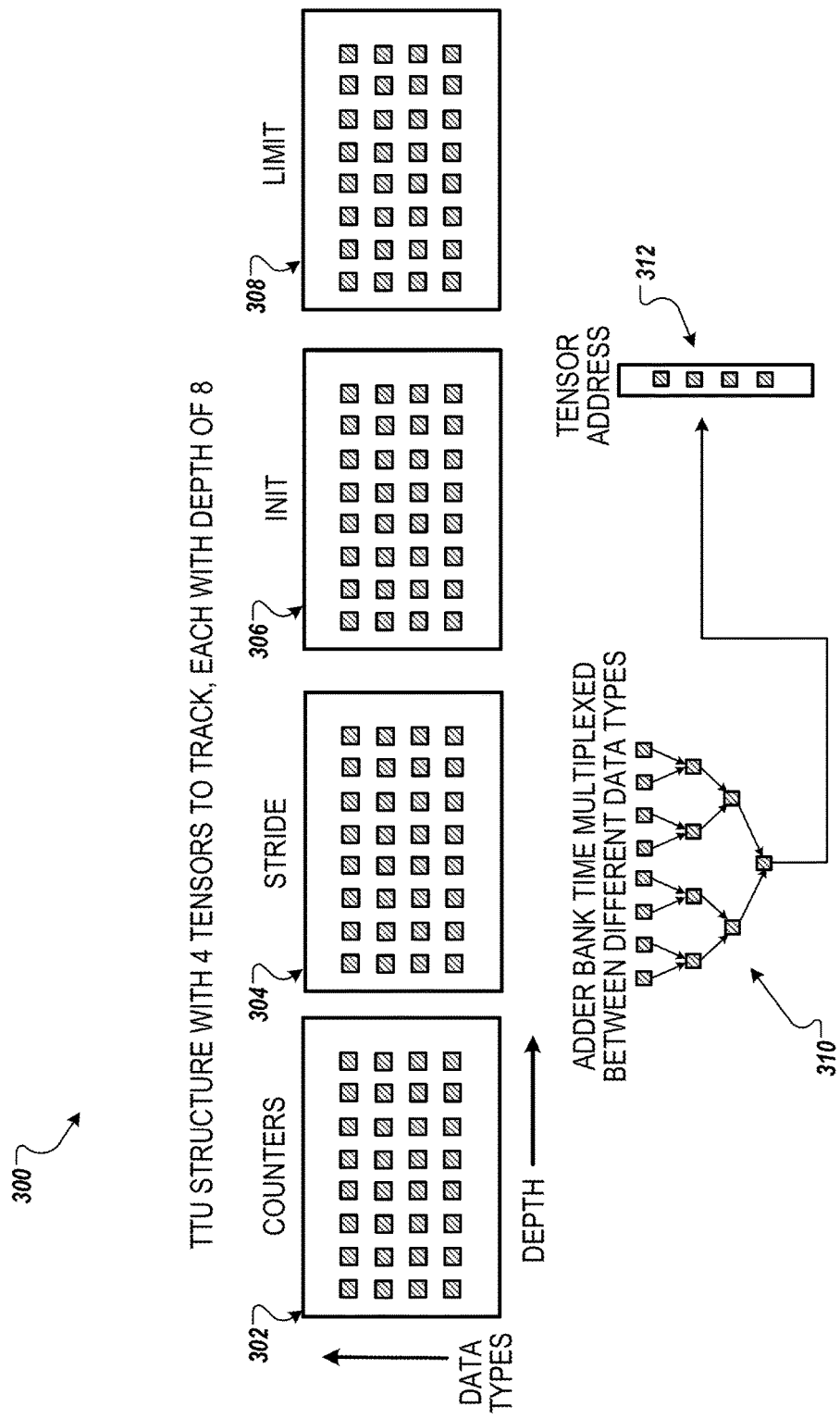
FIG. 3 illustrates an example Tensor Traversal Unit (TTU) structure.

FIG. 3 illustrates an example Tensor Traversal Unit (TTU) structure 300 comprising four tensors to track each having a depth of eight. TTU 300 generally includes a counters tensor 302, a stride tensor 304, an init tensor 306, and a limit tensor 308. TTU 300 further includes an adder bank 310 and a tensor address index 312. As described above, a tensor is a multi-dimensional geometric object and to access an element of the tensor, an index of each dimension must be provided. Because the tensor is stored in narrow memory 210 and wide memory 212, a set of tensor indices must be translated to a set of memory addresses. In some implementations, translation of the indices to memory addresses is done by making the memory addresses a linear combination of the indices and reflecting addresses via tensor address index 312.

There is a TTU per control thread and there is a control thread per instruction type (TensorOP and DMAOp) in compute tile 200. As discussed above, there are three sets of TTUs in compute tile 200: 1) TensorOp TTU 226; and 2)

DMAOp TTU, and Reshape control TTUs 228. In various implementations, TensorOp control 206 will cause TTU 300 to load TensorOp TTU counter 302, limit 308, and stride values 304 at the beginning of a particular tensor operation and will not change the register values before the instruction is retired. Each of the two TTUs will need to generate an address for the following memory address ports in compute tile 200: 1) wide memory 212 address ports, and 2) narrow memory 210 which has four independently arbitrated banks that are presented as four address ports.

As discussed above, in some implementations, narrow memory 210 can include a memory arbiter typically used in shared memory systems to decide, for each memory cycle, which control device (e.g., TensorOp control 206 or DMAOp control 208) will be allowed to access shared memory resources of narrow memory 210. In one example, the different instruction types (TensorOp and DMAOp) are independent control threads that request for memory access that need to be arbitrated. When a particular control thread commits a tensor element to memory, the control thread increments the counters 302 of the tensor reference that was committed to memory.

In one example, when TensorOp control 206 executes an instruction for accessing a particular element of a tensor, TTU 300 can determine the address of the particular element of the tensor, such that the control 206 may access the storage, for example, narrow memory 210 to read data representing an activation value of the particular element. In some implementations, a program may include a nested loop and control 206 may execute an instruction to access an element of a two-dimensional array variable within the nested loop according to current index variable values associated with the nested loop.

TTU 300 may hold traversal state for up to X number of TTU rows for a given tensor(s) at the same time. Each tensor that resides concurrently in TTU 300 occupies a dedicated hardware tensor control descriptor. The hardware control descriptor can consist of X number TTU counters 302 per row position, stride 304, and limit registers 308 that support tensors having up to X number TTU counters per row dimensions. In some implementations, the number of rows and the number of counters per row can be different.

For a given position register, the final memory address is computed from an addition operation that includes adding position registers together. The base address is incorporated into counter 302. One or more adders are shared for tensor references that reside in the same memory. In one implementation, because there can only be a single load/store on any given port in a cycle, it will be a function of the loop nest control to ensure that multiple tensor references that reside in the same narrow or wide memory do not have their counters incremented on any given cycle. The use of registers for computing memory access address values including the determination of offset values are described in greater detail in patent application Ser. No. 15/014,265 titled "Matrix Processing Apparatus," filed on Feb. 3, 2016, the entire disclosure of which is hereby expressly incorporated by reference in its entirety herein.

The following provides template parameters that may be used to instantiate a specialized TTU 300: 1) X Number of TTU Rows; 2) X Number of TTU Counters per Row; 3) X number of TTU Adder Units; 4) per TTU Row indicate shared Adder Reference; and 5) per Counter indicate X Counter Size [TTU][Row] [Depth]. All TTU registers are architecturally visible. An address of a particular tensor element (i.e., tensor address 312) that needs to be accessed for the computation is the result of the addition of the counters. When an increment signal is issued from the control thread to a row of the TTU, TTU 300 executes a single cycle operation and increments an innermost dimension by a stride 304 of that dimension and propagates the rollover through all the depths.

In general, TTU 300 determines a status associated with one or more tensors. The status can include loop bound values, current loop index variable values, dimension multipliers for computing a memory address value, and/or program counter values for handling branch loop bounds. TTU 300 can include one or more tensor status elements and an arithmetic logic unit. Each of the tensor status elements may be a storage element, for example a register or any other suitable storage circuitry. In some implementations, the tensor status elements may be physically or logically arranged into different groups, as described in more detail in patent application Ser. No. 15/014,265, which is incorporated herein by reference in its entirety.

FIG. 4 illustrates an example logical structure 400 of a tile-to-tile network 401 for redistributing tensor slices between compute tiles 410A-410H. As shown in FIG. 4, the tile-to-tile network 401 includes, for each tile, a data communication path from that tile to each tile, including that tile. For example, the tile 410A has a data communication path 402 from itself to itself and a data communication path 403 to each other tile 410B-410H.

FIG. 5 illustrates an example layout 500 of a tile-to-tile network 502 for redistributing tensor slices between compute tiles 510A-510H. The tile-to-tile network 500 includes bus data paths 502 in the form of a ring between the tiles 510A-510H. The tile-to-tile network 500 includes a bus path 502 for each tile 510A-510H. Each tile is the master of its data bus path 502. As described above, each tile 510A-510H can include a bus stop that forwards traffic that is not destined for that tile and that terminates traffic that is addressed to that tile.

Figure 6:
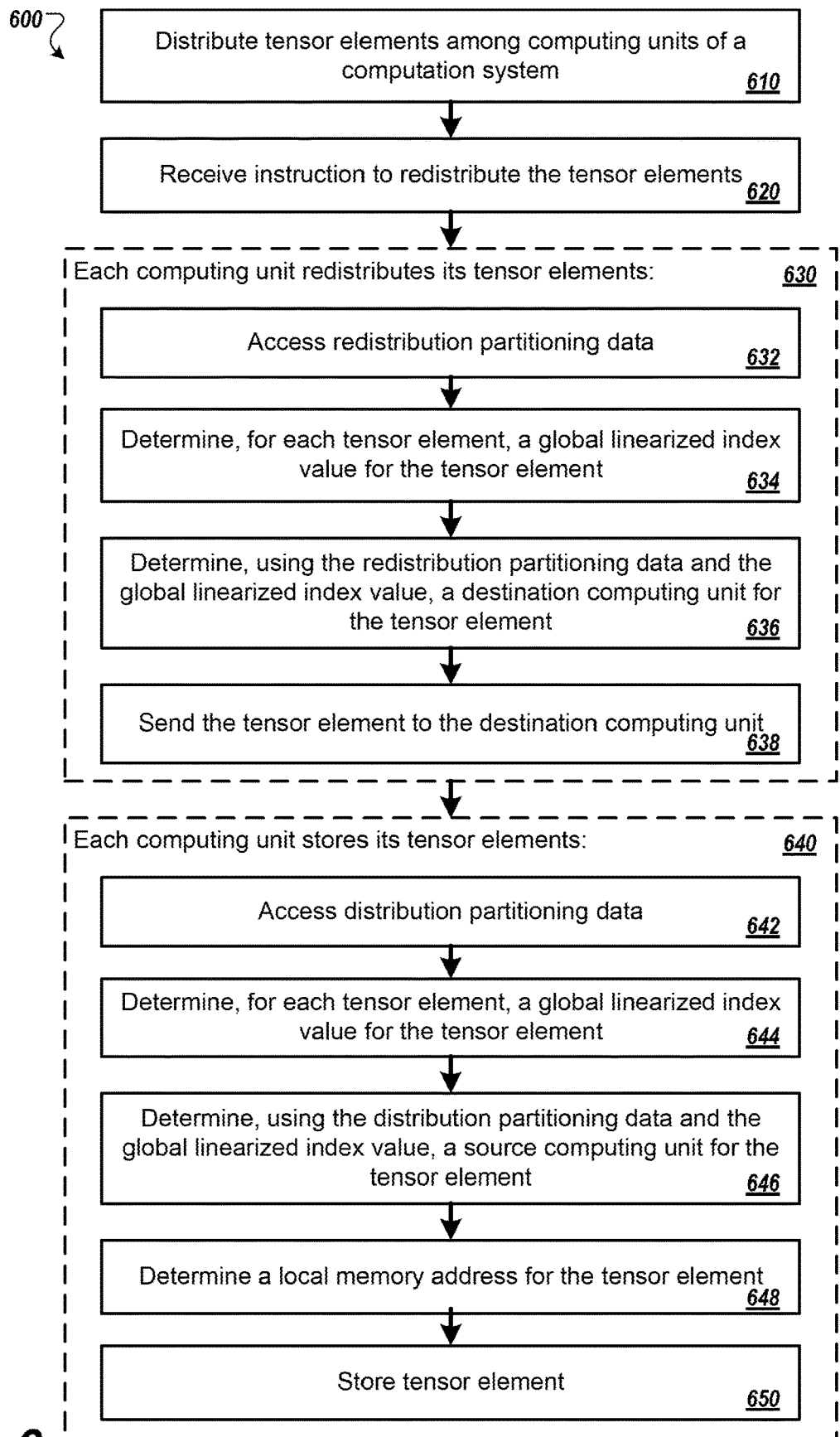
FIG. 6 is a flow diagram of an example process for transferring tensor slices between compute tiles.

FIG. 6 is a flow diagram of an example process 600 for transferring tensor slices between compute tiles. The example process 600 can be performed by a computation system having multiple computing units. For example, the example process can be performed by the computation system 100 of FIG. 1.

The system distributes tensor elements of an N-dimensional tensor among computing units, e.g., compute tiles (610). For example, the system can include one or more sets of computing units arranged in a two dimensional arrangement. The system can partition the N-dimensional tensor into tensor slices across one or more, e.g., two or more, dimensions of the tensor. Each computing unit can receive one or more tensor slices that each includes one or more tensor elements.

The system receives an instruction to redistribute the tensor elements (620). For example, the system can receive an instruction to redistribute the tensor slices from another computing system based on a machine learning model being executed by the computing system. In a particular example, the machine learning model can require a reshaping of the tensor at some point in the model prior to performing additional computations. In another example, the dimensions across which the tensor is partitioned may change, e.g., based on a new partitioning scheme for the tensor.

Each computing unit redistributes its tensor elements (630). As described above, each computing unit can send its tensor elements to the computing units of the computation system. That is, each computing unit can send tensor elements to itself and other computing units based on the new shape of the tensor or the new partitioning scheme for the tensor. Each computing unit can redistribute its tensor elements using constituent operations 632-638.

The computing unit accesses redistribution partitioning data (632). As described above, the redistribution partitioning data can specify, for each computing unit, the tensor elements that are to be stored by the computing unit after redistributing the tensor elements. That is, the redistribution partitioning data can specify, for each computing unit, the tensor slices that will be stored by the computing unit as a result of the new tensor shape or the new partitioning scheme for the tensor. As described above with reference to Table 1, the redistribution partitioning data can specify, for each computing unit, the range of each tiled dimension owned by that tile without specifying values for non-tiled dimensions.

The computing unit determines, for each tensor element, a global linearized index value for the tensor element (634). The global linearized index value for a tensor element is based on the multi-dimensional address for the tensor element in the tensor (e.g., the tensor prior to receiving the instruction to redistribute the tensor elements). That is, the global linearized index value for a tensor element can be based on the tensor indices for the tensor element in the original tensor.

In some implementations, the global linearized index value for each tensor element is along a linear range, e.g., from zero to N—1 where N is the number of tensor elements in the tensor. The equation used to determine such a global linearized index value can be based on the number of dimensions in the N-dimensional tensor and the number of tensor elements along each dimension. For example, the equation for a three-dimensional [y, x, z] tensor can be as shown in Equation 1 below.

$$\text{Global Linearized Index Value} = (iy * x_{length}) + (ix * z_{length}) \quad (1)$$

In Equation 1, the parameter ix is the index of the tensor element on the x dimension, iy is the index of the tensor element on the y dimension, iz is the index of the tensor element on the z dimension, $x_{length}$ is the number of tensor elements along the x dimension, and $z_{length}$ is the number of tensor elements along the z dimension. For other numbers of dimensions, the global linearized index can be computed in a similar way using an additional product of the index of the penultimate dimension by the stride of the last dimension. For example, if the fourth dimension is depth "d," the global linearized index value can be computed using Equation 2 below.

$$\text{Global Linearized Index Value} = (iy * x_{length}) + (ix * z_{length}) + (iz * d_{length}) + id \quad (2)$$

The computing unit determines a destination computing unit for the tensor element (634). The computing unit can determine the destination computing unit to send the tensor element to using the global linearized index value for the tensor element and the redistribution partitioning data (as noted, for one or more tensor elements the destination computing unit may be the computing unit that currently owns the tensor element(s)). As described above, the computing unit can determine the tensor index for the tensor element along each tiled dimension of the reshaped or retiled tensor using the global linearized index value. The computing unit can then compare the index value(s) to the range(s) of index values for each tiled dimension assigned to each computing unit to determine the destination computing unit for the tensor element. For example, if the tensor element has an index of 3 for the x dimension and a particular computing unit is being redistributed a tensor slice that includes tensor elements having an index between 3 and 4 on the x dimension, the computing unit can determine that the particular computing unit is the destination computing unit for the tensor element.

As described above, the computing unit can traverse the tensor elements previously distributed to the computing unit and determine the global linearized index value for the tensor elements using a loop nest. For example, a TTU can use the loop nest to traverse the tensor elements and compute the global linearized index values for the tensor elements. The same loop nest can be used by another TTU to determine the local memory address where the tensor elements are stored. In this way, the computing unit can use the outputs of the TTUs to determine access each tensor element and determine where to send each tensor element in a particular order.

The computing unit sends each tensor element to its respective destination computing unit (638). As described above, each computing unit can be the master of a lane of a tile-to-tile network. Each computing unit can send its tensor elements to the computing units over its lane of the tile-to-tile network. The computing unit can include a header that specifies the destination computing unit for each tensor element.

Each computing unit receives and stores its tensor elements (640). As described above, each computing unit can include a queue for each computing unit. The queue for a particular computing unit stores the tensor elements received from the particular computing unit. The computing unit can access the tensor elements from the queues and store the tensor elements in the appropriate local memory location using constituent operations 642-650.

The computing unit accesses distribution partitioning data (642). The distribution partitioning data can specify, for each computing unit, the tensor elements that were previously stored by the computing unit before redistributing the tensor elements. That is, the distribution partitioning data can specify, for each computing unit, the tensor slices that were stored by the computing unit prior to receiving the instruction for the new tensor shape or the new partitioning scheme for the tensor. As described above with reference to Table 1, the distribution partitioning data can specify, for each computing unit, the range of each tiled dimension owned by that tile without specifying values for non-tiled dimensions.

The computing unit determines, for each tensor element, the global linearized index value for the tensor element (644). This global linearized index value for a tensor element is the same as the global linearized index value determined in operation 634 above. However, this time the value is being determined by the computing unit that received the tensor element rather than the computing unit that sent the tensor element.

As described above, each computing unit can traverse the tensor elements that were redistributed to it using a loop nest. The loop nest can traverse the tensor elements of tensor slice(s) in order along each dimension of the tensor slice(s) such that the computing unit accesses the tensor elements from each queue in the order in which they were received by the queue.

For each tensor element, the computing unit can use the determined global linearized index value to determine the source computing unit for the tensor element (646). The source computing unit is the computing unit that sent the tensor element to the computing unit as part of the redistribution. For example, the computing unit can convert the global linearized index value for the tensor element to its multi-dimensional address, e.g., using the inversion of Equation 1 for three dimensional tensors. This is the multi-dimensional address for the tensor element in the original tensor, e.g., before reshaping. The computing unit can then compare the index of the tensor element for each tiled dimension to the distribution partitioning data to determine which computing unit previously owned the tensor element prior to redistribution.

The computing unit also determines a local memory address for the tensor element (648). The local memory address is an address in local memory at which the tensor element will be stored. As described above, the computing unit can traverse the tensor elements that were redistributed to it using the same loop nest used to determine the global linearized index value for the tensor elements. The computing unit stores the tensor elements in local memory using the determined local memory addresses (650).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
   distributing, by a controller, tensor elements of an N-dimensional tensor among a plurality of computing units of a computation system, wherein each computing unit performs computations using a subset of the tensor elements distributed to the computing unit;
   receiving, by the controller, an instruction to redistribute the tensor elements of the N-dimensional tensor among the computing units;
   in response to receiving the instruction, redistributing, by each computing unit, the subset of tensor elements previously distributed to the computing unit to one or more computing units of the computation system, including, for each particular computing unit of the computation system:
   accessing, by the particular computing unit, redistribution partitioning data that specifies, for each computing unit, the tensor elements that are to be stored by the computing unit after redistributing the tensor elements;

for each tensor element previously distributed to the particular computing unit:
  determining, by the particular computing unit, a global linearized index value for the tensor element based on a multi-dimensional index for the tensor element in the N-dimensional tensor, the multi-dimensional index for the tensor element including, for each dimension of the N-dimensional tensor, an index value that corresponds to a position of the tensor element along that dimension of the N-dimensional tensor;
  determining, by the particular computing unit and using the redistribution partitioning data and the global linearized index value for the tensor element, a destination computing unit of the computation system to which the tensor element is to be redistributed; and
  sending, by the particular computing unit, the tensor element to the destination computing unit.

2. The method of claim 1, wherein the tensor elements of the N-dimensional tensor are redistributed in response to reshaping the N-dimensional tensor, the reshaping including adjusting a number of tensor elements in two or more dimensions of the N-dimensional tensor.

3. The method of claim 2, wherein determining, using the partitioning data and the global linearized index value for the tensor element, a destination computing unit of the computation system to which the tensor element is to be redistributed comprises:
  determining, based on the global linearized index value for the tensor element and a number of tensor elements in each dimension of the reshaped N-dimensional tensor, a second multi-dimensional index for the tensor element in the reshaped N-dimensional tensor; and
  determining, based on the multi-dimensional index for the tensor element and the redistribution partitioning data, the destination computing unit to which the tensor element is to be redistributed.

4. The method of claim 1, wherein:
  distributing the tensor elements of the N-dimensional tensor among the plurality of computing units of the computation system comprises:
    partitioning the N-dimensional tensor into a plurality of tensor slices based on one or more tiled dimensions of the N-dimensional tensor; and
    distributing one or more tensor slices of the N-dimensional tensor to each computing unit; and
  the tensor elements of the N-dimensional tensor are redistributed in response to a change in the one or more tiled dimensions based on which the N-dimensional tensor is partitioned.

5. The method of claim 1, wherein sending the tensor element to the destination computing unit comprises:
  generating, for the tensor element, header information that specifies the destination computing unit;
  transferring the header information and the tensor element to a lane of a tile-to-tile network managed by the particular computing unit; and
  storing, by the destination computing unit, the tensor element in a queue for the particular computing unit, wherein each computing unit includes a respective queue for each computing unit of the computation system, each respective queue stores tensor elements received from the corresponding computing unit that corresponds to the respective queue.

6. The method of claim 5, further comprising:
for each computing unit of the computation system:
  traversing, based on the redistribution partitioning data, a second subset of tensor elements that are being redistributed to the computing unit, including for each particular tensor element in the second subset:
    determining the global linearized index value for the particular tensor element;
    determining, based on the global linearized index value for the particular tensor element and distribution partitioning data, an origination computing unit from which the particular tensor element was received, the distribution partitioning data specifying, for each computing unit, the tensor elements that are to be stored by the computing unit after the tensor elements are distributed;
    obtaining the particular tensor element from the respective queue for the origination computing unit; and
    storing the particular tensor element in local memory of the computing unit.

7. The method of claim 6, wherein determining the global linearized index value for the particular tensor element comprises determining the global linearized index value based on the multi-dimensional index for the particular tensor element.

8. A system, comprising:
  a controller configured to:
    distribute tensor elements of an N-dimensional tensor among a plurality of computing units of a computation system;
    receive an instruction to redistribute the tensor elements of the N-dimensional tensor among the computing units; and
    in response to receiving the instruction, cause the computing units to redistribute a subset of tensor elements previously distributed to the computing unit to one or more computing units;
  wherein each computing unit is configured to:
    perform computations using the subset of the tensor elements distributed to the computing unit;
    access redistribution partitioning data that specifies, for each computing unit, the tensor elements that are to be stored by the computing unit after redistributing the tensor elements;
    for each tensor element previously distributed to the computing unit:
      determine a global linearized index value for the tensor element based on a multi-dimensional index for the tensor element in the N-dimensional tensor, the multi-dimensional index for the tensor element including, for each dimension of the N-dimensional tensor, an index value that corresponds to a position of the tensor element along that dimension of the N-dimensional tensor;
      determine, using the redistribution partitioning data and the global linearized index value for the tensor element, a destination computing unit of the computation system to which the tensor element is to be redistributed; and
      send the tensor element to the destination computing unit.

9. The system of claim 8, wherein the tensor elements of the N-dimensional tensor are redistributed in response to reshaping the N-dimensional tensor, the reshaping including adjusting a number of tensor elements in two or more dimensions of the N-dimensional tensor.

10. The system of claim 9, wherein each computing unit is configured to determine, using the partitioning data and the global linearized index value for the tensor element, a destination computing unit of the computation system to which the tensor element is to be redistributed by:
determining, based on the global linearized index value for the tensor element and a number of tensor elements in each dimension of the reshaped N-dimensional tensor, a second multi-dimensional index for the tensor element in the reshaped N-dimensional tensor; and
determining, based on the multi-dimensional index for the tensor element and the redistribution partitioning data, the destination computing unit to which the tensor element is to be redistributed.

11. The system of claim 8, wherein:
each computing unit is configured to distribute the tensor elements of the N-dimensional tensor among the plurality of computing units of the computation system by:
partitioning the N-dimensional tensor into a plurality of tensor slices based on one or more tiled dimensions of the N-dimensional tensor; and
distributing one or more tensor slices of the N-dimensional tensor to each computing unit; and
and wherein each computing unit is configured to redistribute the tensor elements of the N-dimensional tensor in response to a change in the one or more tiled dimensions based on which the N-dimensional tensor is partitioned.

12. The system of claim 8, wherein each computing unit is configured to send the tensor element to the destination computing unit by:
generating, for the tensor element, header information that specifies the destination computing unit; and
transferring the header information and the tensor element to a lane of a tile-to-tile network managed by the computing unit,
wherein the destination computing unit stores the tensor element in a queue for the computing unit, wherein each computing unit includes a respective queue for each computing unit of the computation system, each respective queue stores tensor elements received from the corresponding computing unit that corresponds to the respective queue.

13. The system of claim 12, wherein each computing unit is configured to:
traverse, based on the redistribution partitioning data, a second subset of tensor elements that are being redistributed to the computing unit, including for each particular tensor element in the second subset:
determine the global linearized index value for the particular tensor element;
determine, based on the global linearized index value for the particular tensor element and distribution partitioning data, an origination computing unit from which the particular tensor element was received, the distribution partitioning data specifying, for each computing unit, the tensor elements that are to be stored by the computing unit after the tensor elements are distributed;
obtain the particular tensor element from the respective queue for the origination computing unit; and
store the particular tensor element in local memory of the computing unit.

14. The system of claim 13, wherein each computing unit is configured to determine the global linearized index value for the particular tensor element by determining the global linearized index value based on the multi-dimensional index for the particular tensor element.

15. A non-transitory computer storage medium encoded with a computer program, the program comprising instructions that when executed by one or more data processing apparatus cause the data processing apparatus to perform operations comprising:
distributing tensor elements of an N-dimensional tensor among a plurality of computing units of a computation system, wherein each computing unit performs computations using a subset of the tensor elements distributed to the computing unit;
receiving an instruction to redistribute the tensor elements of the N-dimensional tensor among the computing units;
in response to receiving the instruction, redistributing, by each computing unit, the subset of tensor elements previously distributed to the computing unit to one or more computing units of the computation system, including, for each particular computing unit of the computation system:
accessing redistribution partitioning data that specifies, for each computing unit, the tensor elements that are to be stored by the computing unit after redistributing the tensor elements;
for each tensor element previously distributed to the particular computing unit:
determining a global linearized index value for the tensor element based on a multi-dimensional index for the tensor element in the N-dimensional tensor, the multi-dimensional index for the tensor element including, for each dimension of the N-dimensional tensor, an index value that corresponds to a position of the tensor element along that dimension of the N-dimensional tensor;
determining, using the redistribution partitioning data and the global linearized index value for the tensor element, a destination computing unit of the computation system to which the tensor element is to be redistributed; and
sending the tensor element to the destination computing unit.

16. The non-transitory computer storage medium of claim 15, wherein the tensor elements of the N-dimensional tensor are redistributed in response to reshaping the N-dimensional tensor, the reshaping including adjusting a number of tensor elements in two or more dimensions of the N-dimensional tensor.

17. The non-transitory computer storage medium of claim 16, wherein determining, using the partitioning data and the global linearized index value for the tensor element, a destination computing unit of the computation system to which the tensor element is to be redistributed comprises:
determining, based on the global linearized index value for the tensor element and a number of tensor elements in each dimension of the reshaped N-dimensional tensor, a second multi-dimensional index for the tensor element in the reshaped N-dimensional tensor; and
determining, based on the multi-dimensional index for the tensor element and the redistribution partitioning data, the destination computing unit to which the tensor element is to be redistributed.

18. The non-transitory computer storage medium of claim 15, wherein:
- distributing the tensor elements of the N-dimensional tensor among the plurality of computing units of the computation system comprises:
  - partitioning the N-dimensional tensor into a plurality of tensor slices based on one or more tiled dimensions of the N-dimensional tensor; and
  - distributing one or more tensor slices of the N-dimensional tensor to each computing unit; and
- the tensor elements of the N-dimensional tensor are redistributed in response to a change in the one or more tiled dimensions based on which the N-dimensional tensor is partitioned.

19. The non-transitory computer storage medium of claim 15, wherein sending the tensor element to the destination computing unit comprises:
- generating, for the tensor element, header information that specifies the destination computing unit;
- transferring the header information and the tensor element to a lane of a tile-to-tile network managed by the particular computing unit; and
- storing, by the destination computing unit, the tensor element in a queue for the particular computing unit, wherein each computing unit includes a respective queue for each computing unit of the computation system, each respective queue stores tensor elements received from the corresponding computing unit that corresponds to the respective queue.

20. The non-transitory computer storage medium of claim 19, wherein the operations comprise:
- for each computing unit of the computation system:
  - traversing, based on the redistribution partitioning data, a second subset of tensor elements that are being redistributed to the computing unit, including for each particular tensor element in the second subset:
    - determining the global linearized index value for the particular tensor element;
    - determining, based on the global linearized index value for the particular tensor element and distribution partitioning data, an origination computing unit from which the particular tensor element was received, the distribution partitioning data specifying, for each computing unit, the tensor elements that are to be stored by the computing unit after the tensor elements are distributed;
  - obtaining the particular tensor element from the respective queue for the origination computing unit; and
  - storing the particular tensor element in local memory of the computing unit.

* * * * *